(12) United States Patent
Liu

(10) Patent No.: US 12,462,521 B2
(45) Date of Patent: Nov. 4, 2025

(54) METHOD, APPARATUS, AND COMPUTER-READABLE STORAGE FOR TARGET IMAGE EXTRACTION

(71) Applicant: Nanning FuLian FuGui Precision Industrial Co., Ltd., Nanning (CN)

(72) Inventor: Kang-Hsi Liu, New Taipei (TW)

(73) Assignee: Nanning FuLian FuGui Precision Industrial Co., Ltd., Nanning (CN)

( * ) Notice: Subject to any disclaimer, the term of this patent is extended or adjusted under 35 U.S.C. 154(b) by 336 days.

(21) Appl. No.: 18/195,914

(22) Filed: May 10, 2023

(65) Prior Publication Data

US 2024/0378847 A1    Nov. 14, 2024

(51) Int. Cl.
*G06V 10/28* (2022.01)
*G06F 3/01* (2006.01)
*G06V 10/22* (2022.01)

(52) U.S. Cl.
CPC ............. *G06V 10/28* (2022.01); *G06F 3/013* (2013.01); *G06V 10/22* (2022.01)

(58) Field of Classification Search
CPC ......... G06V 10/28; G06V 10/22; G06F 3/013
USPC ...................................................... 382/173
See application file for complete search history.

(56) References Cited

U.S. PATENT DOCUMENTS 10,936,899 B2    3/2021  Moloney et al.
2022/0276771 A1  9/2022  Mo et al.

FOREIGN PATENT DOCUMENTS

| CN | 1721144 A   | 1/2006 |
| CN | 106294159 A | 1/2017 |
| CN | 106875408 A | 6/2017 |
| CN | 113902628 A | 1/2022 |
| TW | 202228017 A | 7/2022 |

OTHER PUBLICATIONS

Lagmay, Ezekiel Adriel D., and Maria Mercedes T. Rodrigo. "Enhanced automatic areas of interest (AOI) bounding boxes estimation algorithm for dynamic eye-tracking stimuli." APSIPA Transactions on Signal and Information Processing 11.1 (2022). (Year: 2022).*

Sharma, R. and Cecotti, H., 2019. Classification of graphical user interfaces through gaze-based features. In Recent Trends in Image Processing and Pattern Recognition: Second International Conference, RTIP2R 2018, Solapur, India, Dec. 21-22, 2018, Revised Selected Papers, Part I 2 (pp. 3-16). (Year: 2021).*

Nakamura, Go, et al. "Evaluation and Training System of PC Operation for Elderly, Using Gazing Point and Mouse Operation." 2021 International Conference on Electrical, Computer and Energy Technologies (ICECET). IEEE, 2021. (Year: 2021).*

Liu, Wanyu, et al. "Bignav: Bayesian information gain for guiding multiscale navigation." Proceedings of the 2017 CHI conference on human factors in computing systems. 2017. (Year: 2017).*

* cited by examiner

*Primary Examiner* — Jonathan S Lee
(74) *Attorney, Agent, or Firm* — ScienBiziP, P.C.

(57) ABSTRACT

A method, an apparatus and a computer-readable storage medium for target image extraction. The method comprises obtaining specified coordinate based on user operation behavior data, capturing a background screenshot based on the specified coordinate, and finally determining the target image that the user wants from the background screenshot.

8 Claims, 4 Drawing Sheets

METHOD, APPARATUS, AND COMPUTER-READABLE STORAGE FOR TARGET IMAGE EXTRACTION

FIELD

The subject matter herein generally relates to image processing.

BACKGROUND

Image analysis, data analysis, and artificial intelligence algorithms are commonly used techniques for extracting images from pictures or videos. However, there is currently no appropriate processing method for determining whether the extracted image is the target image that the user wants.

Moreover, even with clear user operation instructions, such as mouse click coordinate or eye-tracking focus coordinate, there is currently no relevant technology available to assist in finding the target image that the user wants.

BRIEF DESCRIPTION OF THE DRAWINGS

Implementations of the present technology will now be described, by way of example only, with reference to the attached figures, wherein.

DETAILED DESCRIPTION

It should be understood that the detailed description and specific examples, while indicating exemplary embodiments, are intended for purposes of illustration only and are not intended to limit the scope of the claims.

Figure 1:
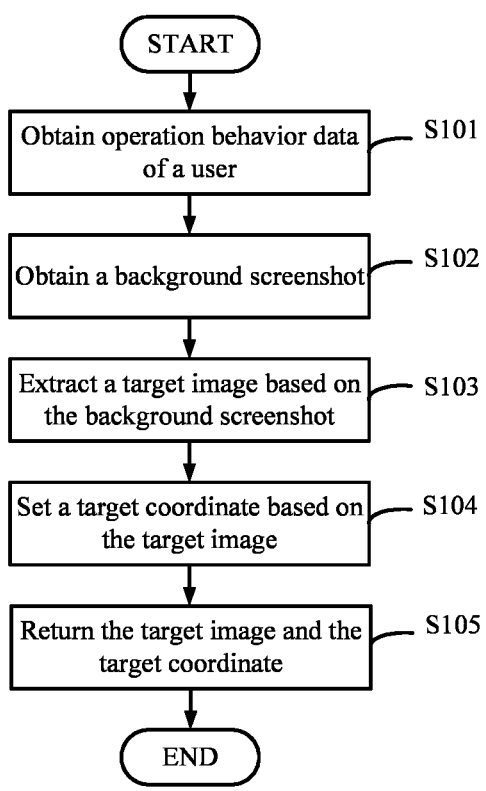
FIG. 1 is a flowchart of a target image extraction method in accordance with an embodiment.

FIG. 1 is a flowchart of a target image extraction method in accordance with an embodiment.

Step S101 is to obtain operation behavior data of a user.

In some implementations, the user's operation behavior data comprises eye-tracking operation data and/or mouse operation data. The eye-tracking operation data comprises gaze fixation information, and the mouse operation data comprises mouse click information.

Step S102 is to obtain a background screenshot based on a specified coordinate obtained from the operation behavior data.

In some implementations, the specified coordinate is obtained based on the user's operation behavior data, and the image within the default range of the specified coordinate is obtained as the background screenshot. Specifically, the user's specified coordinate is obtained based on the gaze fixation information and/or mouse click information in the user's operation behavior data.

In some implementations, the default range is set in pixels, and can be set according to actual needs. For example, a range of $4n^2$ pixels is set as the default range by moving n pixels up, down, left, and right from the specified coordinate, and the image within the default range is obtained as the background screenshot.

Step S103 is to extract a target image based on the background screenshot, where the target image comprises a target icon or a target object.

Step S104 is to set a target coordinate based on the target image.

In some implementation, a centroid of the target image is set as the target coordinate.

Step S105 is to return the target image and the target coordinate.

The target image and the target coordinate are that the user wants to select.

Figure 2:
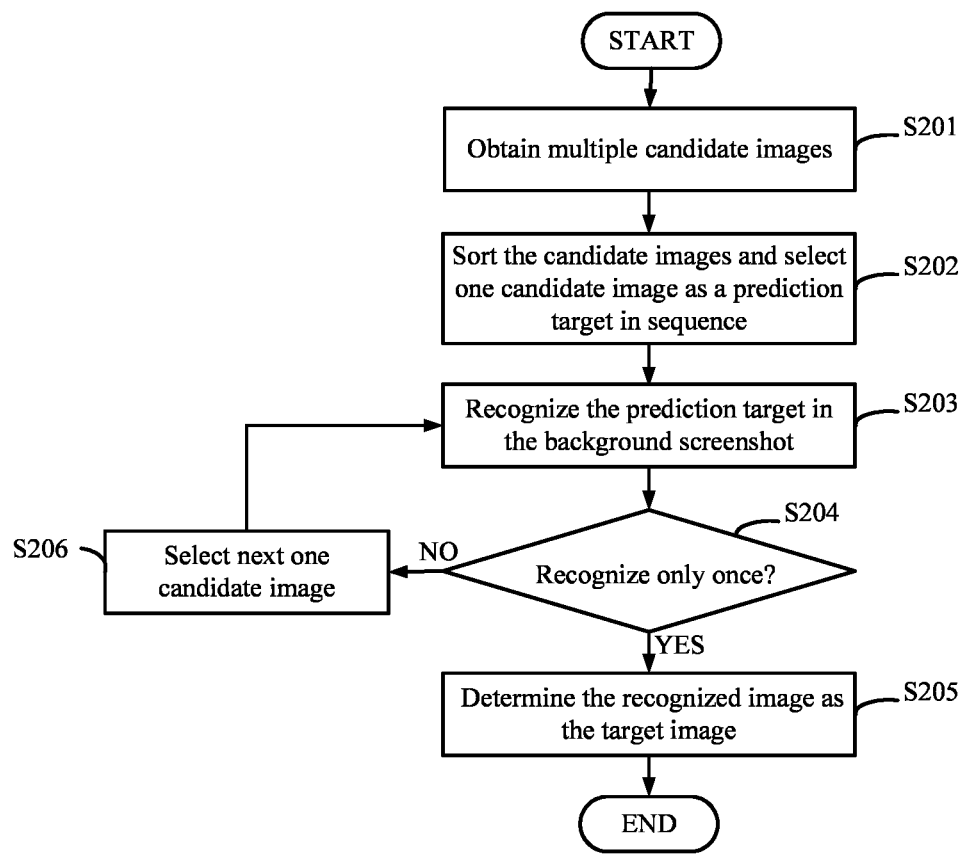
FIG. 2 is a flowchart of the process for extracting the target image in accordance with an embodiment.

FIG. 2 is a flowchart of step S103 of FIG. 1 in one embodiment.

In step S201, multiple candidate images are obtained based on the background screenshot. Since the user's target image is usually not too far from the specified coordinate, in this embodiment, a variable m is set in advance, where m is less than n in step S102. In the background screenshot, multiple $4m^2$ range images are obtained from left to right and top to bottom as multiple candidate images.

In some implementations, various preprocessing methods can be applied to each candidate image, comprising edge extraction. Since the candidate images may include part of the background, edge extraction is used to remove the background and obtain multiple candidate images to avoid the influence of the background on the subsequent image recognition results.

In step S202, the multiple candidate images are sorted based on their image information, and one candidate image is selected as a prediction target in sequence.

In some implementation, the image information comprises the image entropy. Based on the image entropy of each candidate image, the candidate image with the highest image entropy is selected as the prediction target in sequence.

Image entropy is an estimate of image complexity, and images with higher entropy values represent more details and changes. Since the user selects the target image usually as a specific icon or object, its color changes are stronger and more obvious than the surrounding background images. Therefore, the image entropy of the target image will be higher than that of the surrounding background images. In this embodiment, the candidate image with the highest image entropy is judged to be closer to the target image selected by the user, so it is selected as the prediction target.

In step S203, image recognition is performed on the prediction target in the background screenshot.

In step S204, it is determined whether the prediction target can be recognized in the background screenshot and only recognized once.

This step is to avoid interference from multiple recognition results on the determination of the target image. If the prediction target is recognized in the background screenshot and only recognized once, step S205 is executed. If the prediction target cannot be recognized in the background screenshot or is recognized more than once, step S206 is executed, and the next candidate image is selected as the prediction target, i.e., the candidate image with the second-highest image entropy is selected as the prediction target.

In step S205, the recognized image in the background screenshot is determined as the target image.

Figure 3:
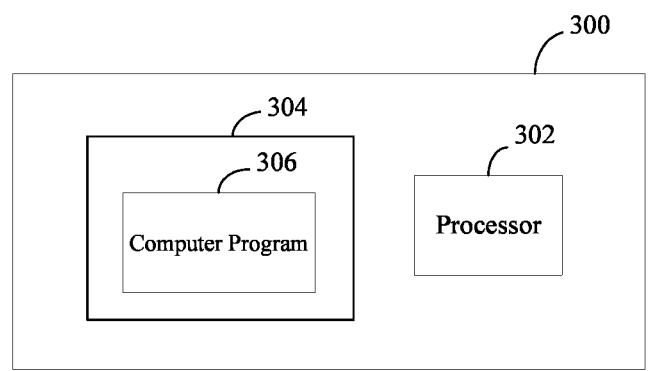
FIG. 3 is a block diagram of an apparatus for target image extraction in accordance with an embodiment.

FIG. 3 is a block diagram of an apparatus 300 for target image extraction according to an embodiment. The apparatus 300 comprises a processor 302, a storage unit 304, and a computer program 306. The apparatus 300 is an electronic device. Those skilled in the art should understand that the composition of the apparatus 300 shown in FIG. 3 does not limit the embodiment of the present invention. The apparatus 300 shown in FIG. 3 is simplified for ease of description, and in different embodiments, it may comprise fewer or more components than shown in the figure.

In one embodiment, the processor 302 may be composed of integrated circuits, for example, a single packaged integrated circuit or a combination of multiple packaged integrated circuits with the same or different functions, comprising one or more central processing units (CPUs), microprocessors, digital processing chips, graphics processing units, and various control chips. The processor 302 is the control unit of the apparatus 300, which connects various components of the apparatus 300 through various interfaces and lines, performs various functions of the apparatus 300, and processes data, such as the method for extracting a target image, by running or executing the computer program 306 or module stored in the storage unit 304 and calling data stored in the storage unit 304.

In one embodiment, the storage unit 304 is used to store the code of the computer program 306 and various data, such as the target image extraction method, and achieves high-speed and automatic access to programs or data during the operation of the device 300. The storage unit 304 includes read-only memory (ROM), programmable read-only memory (PROM), erasable programmable read-only memory (EPROM), one-time programmable read-only memory (OTPROM), electrically erasable programmable read-only memory (EEPROM), read-only optical disc (Compact Disc Read-Only Memory, CD-ROM) or other optical disc storage, magnetic disc storage, magnetic tape storage, or any other computer-readable storage medium capable of carrying or storing data.

Figure 4:
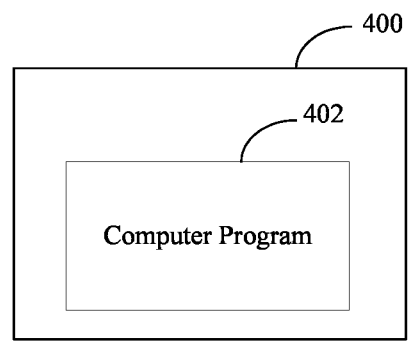
FIG. 4 is a block diagram of a computer-readable storage medium for target image extraction in accordance with an embodiment.

FIG. 4 is a block diagram of a computer-readable storage medium 400 used for target image extraction. In one embodiment, the computer-readable storage medium 400 stores a computer program 402, which, when executed by a processor, implements the method for target image extraction.

In summary, the target image extraction method, device, and computer-readable storage medium can be applied in the AR/VR field and software testing field to effectively determine the target image that the user desires to select.

According to another embodiment of the present invention, the humidity in the current environment can be calculated based on the motion vectors calculated from two consecutive images, and the conversion formula established in advance using the motion vectors as image distortion to represent humidity.

It will be apparent to those skilled in the art that various modifications and variations can be made to the disclosure without departing from the scope or spirit of the claims. In view of the foregoing, it is intended that the present disclosure covers modifications and variations, provided they fall within the scope of the following claims and their equivalents.

What is claimed is:

1. A target image extraction method, comprising following steps:
obtaining operation behavior data of a user;
obtaining a specified coordinate based on the operation behavior data and obtaining a background screenshot based on the specified coordinate;
extracting a target image from the background screenshot, wherein the target image is provided with a target object and wherein extracting the target image from the background screenshot further comprises:
obtaining multiple candidate images based on the background screenshot;
sorting the candidate images based on image information and sequentially selecting one candidate image as a predicted target, wherein the image information includes an image entropy, and sorting the candidate images based on image information and sequentially selecting one candidate image as a predicted targets further comprises:
selecting the candidate image with highest image entropy as the predicted target;
performing image recognition in the background screenshot based on each predicted target;
determining whether the selected predicted target is recognized in the background screenshot and recognized only once;
using the predicted target with the highest image entropy and recognized only once in the background screenshot as the target image;
setting a target coordinate based on the target image; and
returning the target image and the target coordinate.

2. The method of claim 1, wherein the operation behavior data is provided with eye-tracking operation data.

3. The method of claim 1, wherein the operation behavior data is provided with mouse operation data.

4. The method of claim 1, wherein obtaining the specified coordinate based on the operation behavior data and obtaining a background screenshot based on the specified coordinate further comprises:
obtaining an image within a default range from the specified coordinate as the background screenshot.

5. The method of claim 1, wherein setting the target coordinate based on the target image further comprises:
setting a centroid of the target image as the target coordinate.

6. The method of claim 1, wherein extracting the target image from the background screenshot further comprises:
performing preprocessing on the candidate images, wherein the preprocessing is provided with edge extraction.

7. A device for target image extraction, comprising:
a processor; and
a storage unit for storing a computer program, wherein when the computer program is executed by the processor, the processor is configured for:
obtaining operation behavior data from a user;
obtaining a specified coordinate based on the operation behavior data and obtaining a background screenshot based on the specified coordinate;
extracting a target image from the background screenshot, wherein the target image is provided with a target object and wherein extracting the target image from the background screenshot further comprises:
obtaining multiple candidate images based on the background screenshot;
sorting the candidate images based on image information and sequentially selecting one candidate image as a predicted target, wherein the image information includes an image entropy, and sorting the candidate images based on image information and sequentially selecting one candidate image as a predicted targets further comprises:
selecting the candidate image with highest image entropy as the predicted target;
performing image recognition in the background screenshot based on each predicted target;

determining whether the selected predicted target is recognized in the background screenshot and recognized only once;

using the predicted target with the highest image entropy and recognized only once in the background screenshot as the target image;

setting a target coordinate based on the target image; and returning the target image and the target coordinate.

8. A non-transitory computer-readable storage medium storing a computer program, wherein when the computer program is executed by a processor, the processor is configured for:

obtaining operation behavior data from a user;

obtaining a specified coordinate based on the operation behavior data and obtaining a background screenshot based on the specified coordinate;

extracting a target image from the background screenshot, wherein the target image is provided with a target object and wherein extracting the target image from the background screenshot further comprises:

obtaining multiple candidate images based on the background screenshot;

sorting the candidate images based on image information and sequentially selecting one candidate image as a predicted target, wherein the image information includes an image entropy, and sorting the candidate images based on image information and sequentially selecting one candidate image as a predicted targets further comprises:

selecting the candidate image with highest image entropy as the predicted target;

performing image recognition in the background screenshot based on each predicted target;

determining whether the selected predicted target is recognized in the background screenshot and recognized only once;

using the predicted target with the highest image entropy and recognized only once in the background screenshot as the target image;

setting a target coordinate based on the target image; and returning the target image and the target coordinate.

* * * * *